United States Patent
Ketchel et al.

(10) Patent No.: US 10,047,801 B2
(45) Date of Patent: Aug. 14, 2018

(54) INTEGRATED PINION SHAFT AND CV JOINT ASSEMBLY FOR VEHICULAR DRIVELINES

(71) Applicant: MAGNA POWERTRAIN OF AMERICA, INC., Troy, MI (US)

(72) Inventors: Bradley Ketchel, Oxford, MI (US); Wade Smith, Metamora, MI (US)

(73) Assignee: MAGNA POWERTRAIN OF AMERICA, INC., Troy, MI (US)

( * ) Notice: Subject to any disclaimer, the term of this patent is extended or adjusted under 35 U.S.C. 154(b) by 199 days.

(21) Appl. No.: 15/095,345

(22) Filed: Apr. 11, 2016

(65) Prior Publication Data

US 2017/0292570 A1   Oct. 12, 2017

(51) Int. Cl.
*F16D 3/227* (2006.01)
*F16H 48/08* (2006.01)
(Continued)

(52) U.S. Cl.
CPC .............. *F16D 3/227* (2013.01); *B60K 17/02* (2013.01); *B60K 17/16* (2013.01); *B60K 17/22* (2013.01); *B60K 17/34* (2013.01); *B60K 17/344* (2013.01); *B60K 23/0808* (2013.01); *F16D 3/223* (2013.01); *F16H 37/0813* (2013.01); *F16H 48/08* (2013.01); *B60K 2023/085* (2013.01); *B60K 2023/0883* (2013.01); *B60Y 2400/80* (2013.01); *B60Y 2400/82* (2013.01); *F16D 2003/22303* (2013.01); *F16H 2048/087* (2013.01)

(58) Field of Classification Search
CPC ...................... F16D 3/227; F16D 3/223; F16D 2003/22303; B60K 17/34; B60K 23/0808; B60K 17/02; B60K 17/344; B60K 17/22; B60K 17/16; B60K 2023/0883; B60K 2023/085; F16H 37/0813; F16H 48/08; F16H 2048/087
See application file for complete search history.

(56) References Cited

U.S. PATENT DOCUMENTS 3,367,139 A * 2/1968 Ristau ................. F16D 3/227
                                                    464/144
4,635,744 A   1/1987 Hiraiwa
(Continued)

FOREIGN PATENT DOCUMENTS

| AT | 309161 B | 8/1973 |
| EP | 1826089 A2 | 8/2007 |
| WO | WO03095256 A1 | 11/2003 |

OTHER PUBLICATIONS

International Search Report and Written Opinion dated Jul. 3, 2017 from corresponding International Application No. PCT/US2017/026288.

*Primary Examiner* — David J Hlavka
(74) *Attorney, Agent, or Firm* — Dickinson Wright PLLC

(57) ABSTRACT

An integrated pinion shaft and constant velocity joint (PS/CVJ) assembly for use in motor vehicle driveline applications to transfer torque between a propshaft and a ring gear. The PS/CVJ assembly includes a pinion shaft having a pinion gear segment meshed with the ring gear and a hollow pinion shaft segment. The PS/CVJ assembly also includes a constant velocity joint having an inner race coupled to the propshaft and an outer race integral with or fixed to an end portion of the pinion shaft segment.

18 Claims, 13 Drawing Sheets

(51) Int. Cl.
   *B60K 17/16*   (2006.01)
   *B60K 17/22*   (2006.01)
   *B60K 17/344*  (2006.01)
   *B60K 23/08*   (2006.01)
   *B60K 17/02*   (2006.01)
   *F16H 37/08*   (2006.01)
   *B60K 17/34*   (2006.01)
   *F16D 3/223*   (2011.01)

(56) References Cited

U.S. PATENT DOCUMENTS

| | | |
|---|---|---|
| 5,916,055 A | 6/1999 | Wormbaecher |
| 7,252,616 B2 | 8/2007 | Wormsbaecher |
| 2006/0048992 A1 | 3/2006 | Gansloser et al. |
| 2009/0227382 A1* | 9/2009 | Blecke ............... B60K 17/16 464/145 |
| 2012/0004044 A1 | 1/2012 | Conger et al. |
| 2014/0141895 A1* | 5/2014 | Dine ................ F16D 1/0876 464/160 |
| 2014/0174253 A1 | 6/2014 | Stephens et al. |
| 2014/0349771 A1 | 11/2014 | Oh |
| 2016/0333954 A1* | 11/2016 | Lindberg ............ F16D 65/186 |

* cited by examiner

INTEGRATED PINION SHAFT AND CV JOINT ASSEMBLY FOR VEHICULAR DRIVELINES

FIELD

The present disclosure relates generally to power transfer systems configured to control the distribution of drive torque from a powertrain to front and rear drivelines of four-wheel drive (4WD) and all-wheel drive (AWD) motor vehicles. More specifically, the present disclosure is directed to hypoid gearsets of the type used in power transfer assemblies having an integrated pinion shaft and constant velocity joint assembly.

BACKGROUND

This section provides background information related to the present disclosure which is not necessarily prior art.

In view of consumer demand for 4WD and AWD motor vehicles, a large number of power transfer systems are currently utilized in vehicular applications for selectively and/or automatically transmitting rotary power (i.e., drive torque) from the powertrain to all four wheels. In most power transfer systems, a power transfer assembly is used to deliver drive torque from the powertrain to one or both of the primary and secondary drivelines. The power transfer assembly is typically equipped with a torque transfer clutch that can be selectively actuated to shift operation of the power transfer system between a two-wheel drive mode and a four-wheel drive mode. In the two-wheel drive mode, drive torque is only transmitted from the powertrain to the primary driveline. In contrast, a portion of the drive torque generated by the powertrain can also be transmitted through the torque transfer clutch to the secondary driveline when the vehicle is operating in the four-wheel drive mode.

In most 4WD vehicles, the power transfer assembly is a transfer case arranged to normally transmit drive torque to the rear driveline and selectively/automatically transfer drive torque through the torque transfer clutch to the front driveline. In contrast, in most AWD vehicles, the power transfer assembly is a power take-off unit (PTU) arranged to normally transmit drive torque to the front driveline and selectively/automatically transfer drive torque through the torque transfer clutch to the rear driveline.

Many power transfer assemblies are equipped with an adaptively-controlled torque transfer clutch to provide an "on-demand" power transfer system operable for automatically biasing the torque distribution ratio between the primary and secondary drivelines, without any input or action on the part of the vehicle operator, when traction is lost at the primary wheels. Modernly, such torque transfer clutches are configured to include a multi-plate friction clutch and a power-operated clutch actuator that is interactively associated with an electronic traction control system having a controller and a plurality of vehicle sensors. During normal operation, the friction clutch can be maintained in a released condition so as to transmit drive torque only to the primary wheels and establish the two-wheel drive mode. However, upon detection of conditions indicative of a low traction condition, the power-operated clutch actuator is actuated to engage the friction clutch and deliver a portion of the total drive torque to the secondary wheels, thereby establishing the four-wheel drive mode.

In virtually all power transfer systems of the types noted above, the secondary driveline is configured to include a propshaft, a drive axle assembly, and one or more constant velocity universal joints. The opposite ends of the propshaft are drivingly interconnected via the constant velocity joints to a rotary output component of the power transfer assembly and to a rotary input component of the axle assembly. Typically, a hypoid gearset is used to transmit drive torque from the propshaft to a differential gear mechanism associated with the drive axle assembly. The differential gear mechanism may include a differential carrier rotatably supported in an axle housing and which drives at least one pair of bevel pinions which, in turn, are commonly meshed with first and second output bevel gears that are connected to corresponding first and second axleshafts which drive the secondary wheels. The hypoid gearset typically includes a pinion gear meshed with a ring gear. The pinion gear is typically formed integrally with, or fixed to, a solid pinion shaft that is rotatably support by the axle housing. The pinion shaft is usually connected via one of the constant velocity joints to the propshaft. The ring gear is usually fixed for rotation with the differential carrier. Due to the axial thrust loads transmitted through the hypoid gearset, it is common to utilize at least two laterally-spaced tapered bearing assemblies to support the pinion shaft for rotation within the axle housing.

Many constant velocity joints (CVJ) are sealed in order to retain a lubricant, such as grease, inside the joint while keeping contaminants and foreign matter, such as dirt and water, out of the joint. To achieve this protection, the CVJ is typically enclosed at the open end of the outer race by a sealing boot made of resilient and flexible material, such as rubber. The opposite end of the outer race is sometimes formed by an enclosed dome or grease cap. Such sealing is necessary since once the inner chamber of the CVJ is partially-filled with the lubricant, it is generally lubricated for life. It is often necessary to vent the CVJ in order to minimize air pressure fluctuations which result from expansion and contraction of air within the joint during operation and as a result of elevation changes.

In addition to fixed constant velocity joints, plunging constant velocity joints are also used in 4WD and AWD vehicles to provide a plunging end motion feature which allows the interconnected shafts to change length during operation. Plunging constant velocity joints are commonly used to interconnect the pinion shaft of the hypoid gearset in the drive axle assembly to the propshaft. One type of plunging constant velocity joint includes a plurality of balls retained in a cage and which are located in circumferentially-spaced straight or helical grooves formed in the inner and outer races. Typically, the outer race of the CVJ is fixed to the propshaft stub shaft which, in turn, is fixed to the propshaft tube section. An intermediate flange component is then required to attach the differential end of the CVJ to a traditional pinion shaft. This standard design tends to increase the overall system length of the driveline arrangement and results in increased weight.

While such conventional coupling arrangements between the propshaft and the pinion shaft of the power transfer assembly are adequate for their intended purpose, a need still exists to advance the technology and structure of such products to provide enhanced configurations that provide improved efficiency, reduced weight, and reduced packaging requirements.

SUMMARY

This section provides a general summary of the disclosure and is not to be interpreted as a complete and comprehensive listing of all of the objects, aspects, features and advantages associated with the present disclosure.

It is an aspect of the present disclosure to provide a coupling arrangement between an open end of a tubular pinion shaft and a constant velocity joint for defining an integrated pinion shaft/constant velocity joint (PS/CVJ) assembly.

It is a related aspect of the present disclosure to configure the PS/CVJ assembly such that the constant velocity joint is integrated into and disposed within the open end of the tubular pinion shaft.

It is another aspect of the present disclosure to arrange the PS/CVJ assembly for use with a hypoid gearset in power transfer assembly configured as a drive axle assembly or a power take-off unit.

In accordance with these and other aspects of the present disclosure, a power take-off unit for transmitting drive torque from a powertrain to a driveline comprises: a housing; a rotary member rotatably supported by the housing and driven by the powertrain; a hypoid gearset having a ring gear adapted to be driven by the rotary member and a pinion gear meshed with the ring gear, the pinion gear extending from a first end of a tubular pinion shaft that is rotatably supported by the housing; and a constant velocity joint having a first joint component drivingly connected to a second end of the tubular pinion shaft, a second joint component coupled to a propshaft associated with the driveline, and torque transmitting elements configured to transmit drive torque from the first joint component to the second joint component.

In accordance with these and other aspects of the present disclosure, a drive axle assembly for transmitting drive torque from a powertrain to a pair of wheels comprises: an axle housing defining a differential chamber and a pinion chamber; a differential assembly having a differential carrier rotatably supported in the differential chamber of the axle housing, and a differential gearset drivingly connecting the differential carrier to a pair of axleshafts connected to the pair of wheels; a hypoid gearset including a ring gear fixed for rotation with the differential carrier and a pinion gear meshed with the ring gear, the pinion gear extending from a first end of a tubular pinion shaft that is rotatably supported in the pinion chamber of the axle housing; and a constant velocity joint operably coupled to a second end of the tubular pinion shaft, the constant velocity joint having a first joint component drivingly connected to the second end of the pinion shaft, a second joint component coupled to a propshaft for receiving drive torque from the powertrain, and torque transmitting elements configured to transmit drive torque from the second joint component to the first joint component.

In accordance with these and other aspects of the present disclosure, a pinion shaft and constant velocity joint for use between a ring gear and a propshaft in a motor vehicle driveline comprises a pinion shaft having a pinion gear segment meshed with the ring gear and an elongated tubular pinion shaft segment, and a constant velocity joint having an outer race fixed for rotation with the pinion shaft segment of the pinion shaft, an inner race fixed for rotation with the propshaft, and a joint assembly disposed between the outer race and the inner race to provide constant speed torque transfer therebetween and permit angular movement of the inner race relative to the outer race.

The pinion shaft and constant velocity joint of the present disclosure are configured to define an integrated pinion shaft/constant velocity joint (PS/CVJ) assembly. In accordance with one embodiment of the PS/CVJ assembly, the outer race of the constant velocity joint is formed within the open second end of the pinion shaft segment of the pinion shaft. In accordance with another embodiment of the PS/CVJ assembly, the outer race of the constant velocity joint surrounds the open second end of the pinion shaft segment of the pinion shaft.

Further areas of applicability will become apparent from the detailed description provided herein. The specific embodiments and examples set forth in this summary are intended for purposes of illustration only and are not intended to limit the scope of the present disclosure.

DRAWINGS

The drawings described herein are provided for illustrative purposes only of selected embodiments and are not intended to limit the scope of the present disclosure. According to the following:

Figure 9:
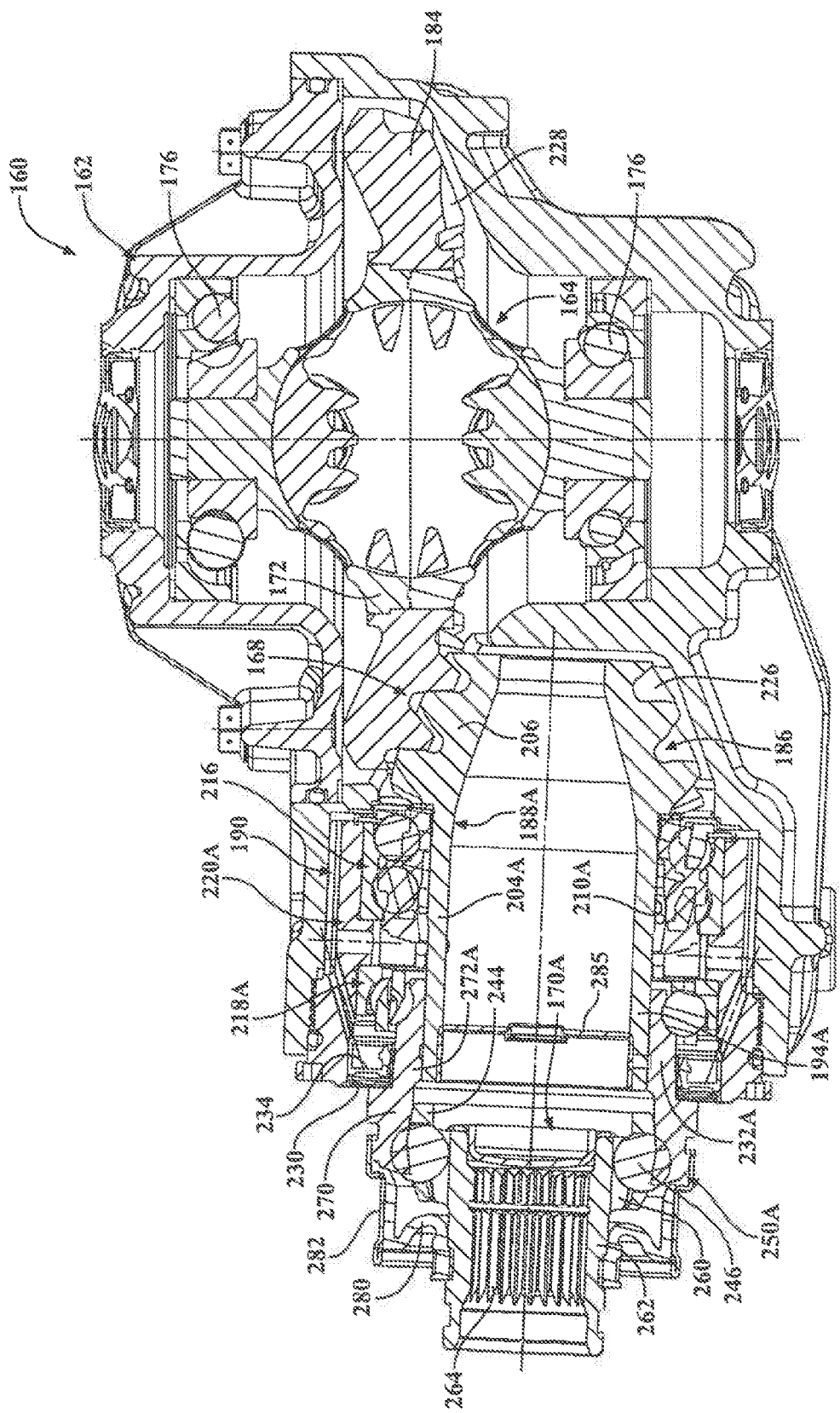
FIG. 9 is a sectional view of the integrated PS/CVJ assembly shown in FIG. 8 installed in the drive axle assembly.
Figure 12:
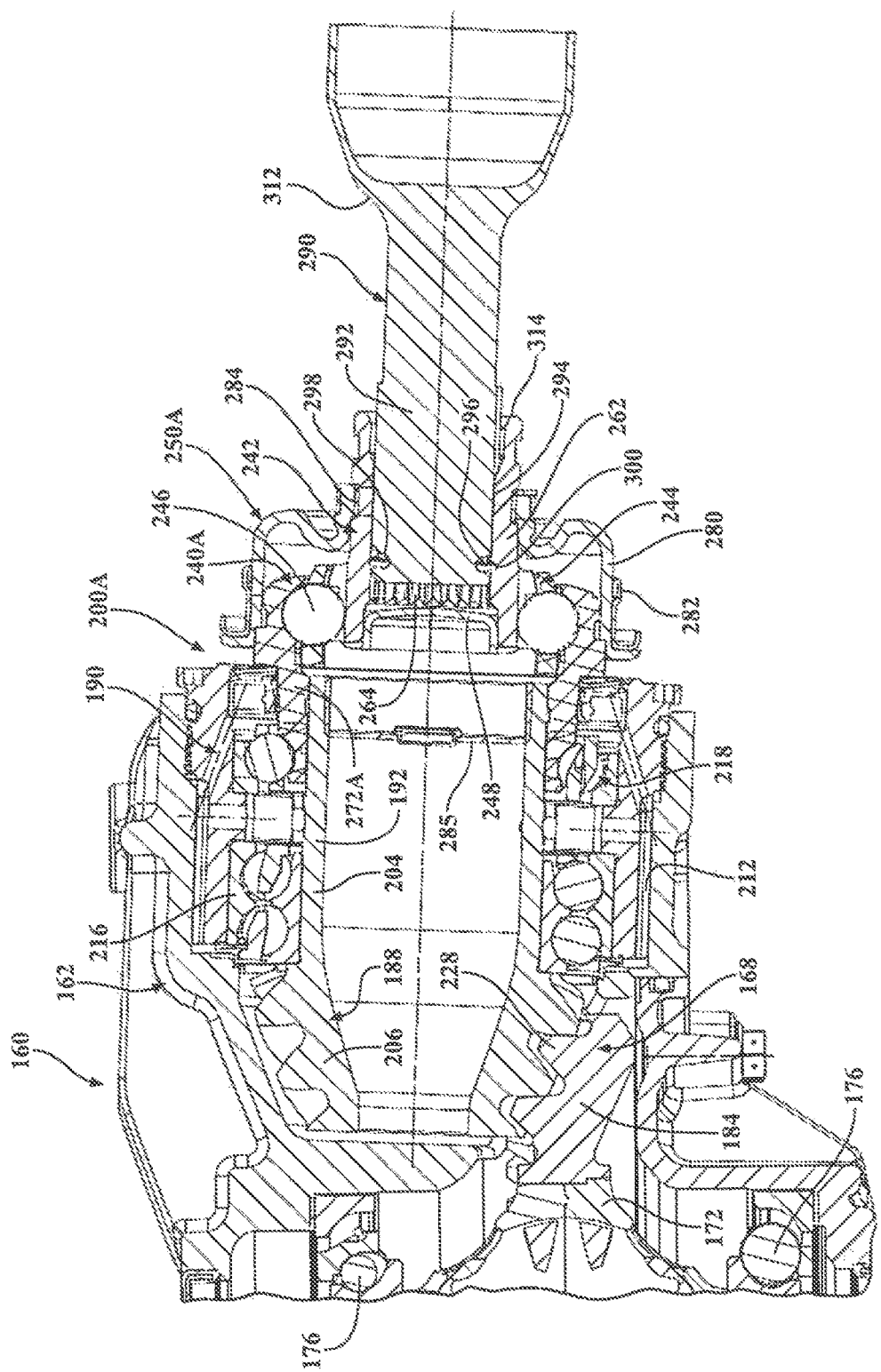
Figure 13:
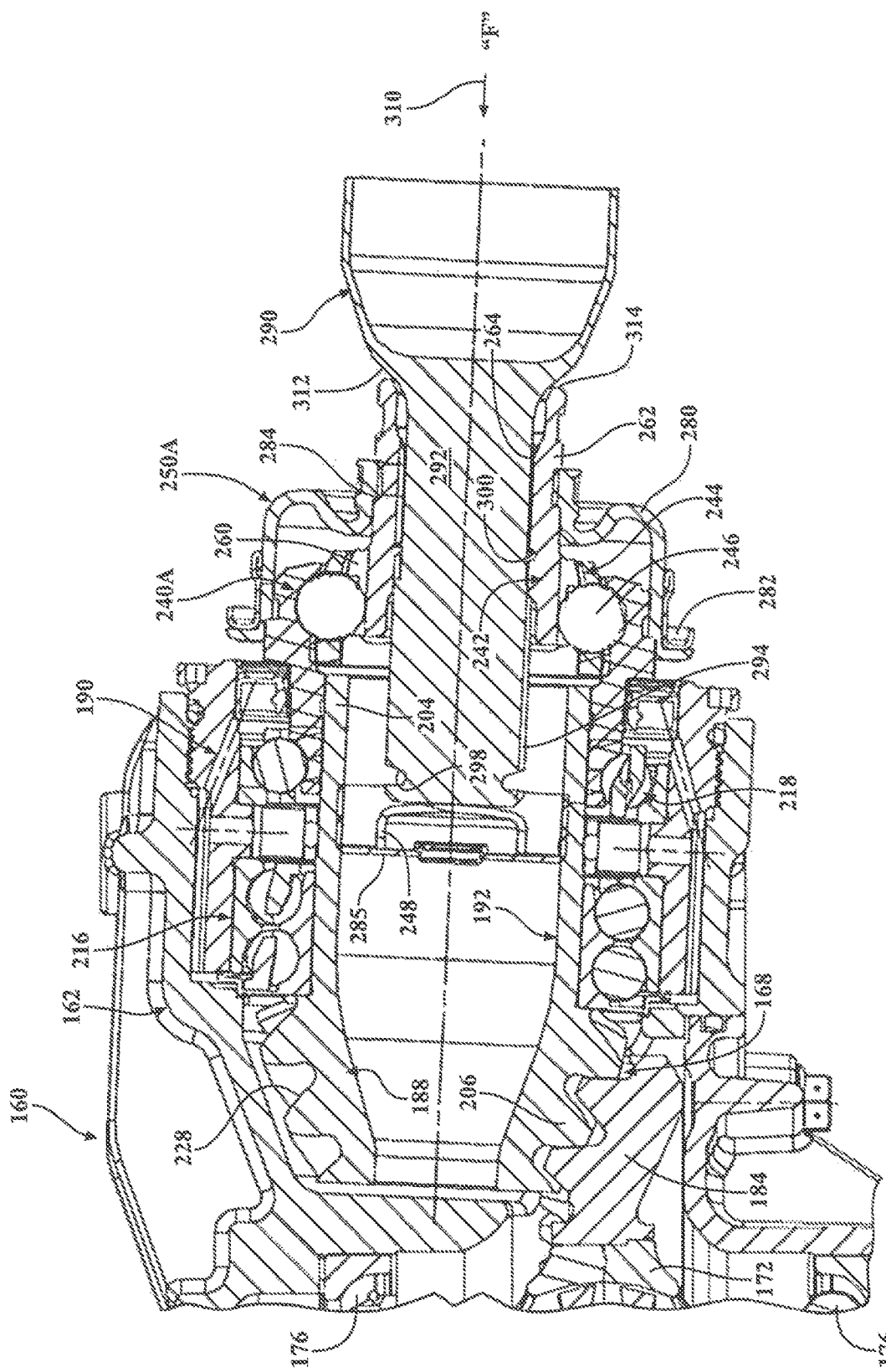

FIG. 12 is a sectional view of the integrated PS/CVJ assembly shown in FIG. 9 drivingly connected to a propshaft and illustrating the propshaft located in a normal operating position with respect to the constant velocity joint and the pinion shaft; and FIG. 13 is a sectional view, generally similar to FIG. 12, but illustrating movement of the propshaft from its normal operating position into an axially retracted position with respect to the constant velocity joint and the pinion shaft so as to provide a crash mitigation feature.

DETAILED DESCRIPTION

Example embodiments will now be described more fully with reference to the accompanying drawings. The example embodiments are provided so that this disclosure will be thorough, and will fully convey the scope to those who are skilled in the art. In particular, various examples of different power transfer systems for motor vehicles will be described to which products and/or assemblies embodying the teachings of the present disclosure are well-suited for use. To this end, various power transfer assemblies including, without limitations, transfer cases, power take-off units and drive axle assemblies equipped with torque transfer coupling and/or differentials are disclosed which can be equipped with a hypoid gearset having an integrated pinion shaft and constant velocity joint (PS/CVJ) assembly constructed in accordance with the teachings of the present disclosure. As will be detailed, each embodiment of the integrated PS/CVJ assembly disclosed herein generally includes a tubular pinion shaft and one of a fixed-type or a plunging-type constant velocity joint associated with the tubular pinion shaft. However, in describing each of these embodiments, numerous specific details are set forth such as examples of specific components, devices, and methods, for providing a thorough understanding of these embodiments of the present disclosure. It will be apparent to those skilled in the art that all specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "compromises," "comprising," "including," and "having," are inclusive and therefore specify the presence of stated features, integers, steps, operations, elements, and/or components, but do not preclude the presence or addition of one or more other features, integers, steps, operations, elements, and/or components, but do not preclude the presence or addition of one or more other features, integers, steps operations, elements, components, and/or groups thereof. The method steps, processes, and operations described herein are no to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below.

Figure 1:
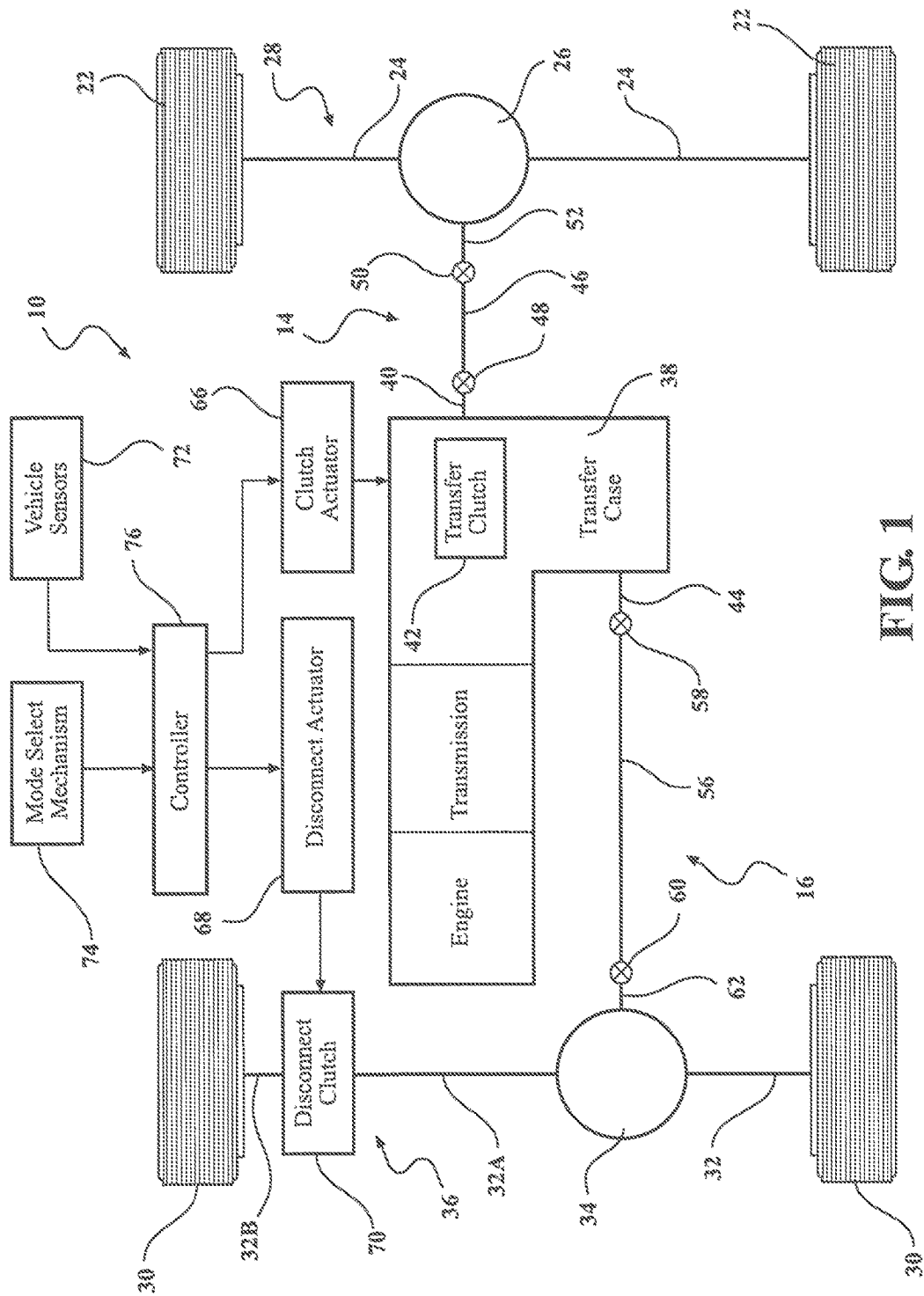
FIG. 1 is a schematic view of a four-wheel drive (4WD) motor vehicle equipped with one or more products and/or assemblies embodying the teachings of the present disclosure.

Referring initially to FIG. 1, an example of a four-wheel drive (4WD) power transfer system for a motor vehicle 10 is shown. Motor vehicle 10 includes a powertrain 12 operable for generating and transmitting rotary power (i.e. drive torque) to a first or primary driveline 14 and a second or secondary driveline 16. Powertrain 12 is shown in this non-limiting example to include an internal combustion engine 18 and a transmission 20. Primary driveline 14, hereinafter identified as the rear driveline, includes a pair of ground-engaging rear wheels 22 that are interconnected via a pair of rear axleshafts 24 to a rear differential assembly 26 as part of a rear drive axle assembly 28. Secondary driveline 16, hereinafter identified as the front driveline, includes a pair of ground-engaging front wheels 30 that are interconnected via a pair of front axleshafts 32 to a front differential assembly 34 defining a front drive axle assembly 36.

The power transfer system also includes a transfer case 38 configured to receive drive torque from powertrain 12 and transmit the drive torque permanently to rear driveline 14 and selectively/automatically to front driveline 16. Transfer case 38 generally includes a rear output shaft 40, a torque transfer clutch 42, and a front output shaft 44. A first end of a rear propshaft 46, also associated with rear driveline 14, is shown drivingly connected via first joint coupling 48 to rear output shaft 40. A second end of rear propshaft 46 is shown drivingly coupled via a second joint coupling 50 to an input component 52 of rear axle assembly 28. As will be detailed, input component 52 is a pinion shaft having a pinion gear meshed with a ring gear and which together define a rear hypoid gearset. The ring gear of the rear hypoid gearset drives rear differential assembly 26. As such, rear propshaft 46 is configured to transmit drive torque from rear output shaft 40 of transfer case 38 to rear axle assembly 28. Similarly, a first end of a front propshaft 56, associated with front driveline 16, is shown drivingly connected via a first joint coupling 58 to front output shaft 44. A second end of front propshaft 56 is shown drivingly connected via a second joint coupling 60 to an input component 62 of front axle assembly 36. Input component 62 is also a pinion shaft having a pinion gear that is meshed with a ring gear and which together define a front hypoid gearset. The ring gear of the front hypoid gearset drives front differential assembly 34. Thus, front propshaft 56 is configured to transmit drive torque from front output shaft 44 of transfer case 38 to front axle assembly 36. As will be detailed hereafter with greater specificity, the present disclosure embodies alternative configurations for combining rear pinion shaft 52 and first coupling joint 50 into an integrated pinion shaft/constant velocity joint (PS/CVJ) assembly. The alternative configurations for the PS/CVJ assembly are also applicable to the interconnection between front pinion shaft 62 and second joint coupling associated with front driveline 16.

With continued reference to FIG. 1 of the drawings, motor vehicle 10 is further shown, in this non-limiting embodiment, to include an electronically-controlled power transfer system configured to permit a vehicle operator to select between a two-wheel drive (2WD) mode, a part-time or "locked" four-wheel drive (LOCK-4WD) mode, and an adaptive or "on-demand" four-wheel drive (AUTO-4WD) mode. In this regard, transfer case 38 is equipped with torque transfer clutch 42 that can be selectively actuated for transferring drive torque from powertrain 12 to front output shaft 44 for establishing the LOCK-4WD and AUTO-4WD modes of operation. The power transfer system further includes a power-operated clutch actuator 66 for controlling actuation of transfer clutch 42, a power-operated disconnect actuator 68 for controlling actuation of a disconnect clutch 70, a plurality of vehicle sensors 72 for detecting certain dynamic and operational characteristics of the motor vehicle, a mode selector 74 for permitting the vehicle operator to select one of the available drive modes, and a controller unit 76 for controlling coordinated actuation of actuators 66, 68 in response to input signals from vehicle sensors 72 and a mode signal from mode selector 74. Front axle assembly 36 is of the "disconnectable" type and is shown with disconnect clutch 70 operably disposed between shaft segments 32A, 32B of one of front axleshafts 32.

To establish the 2WD mode, clutch actuator 66 is controlled to shift transfer clutch 42 into a "released" mode while disconnect actuator 68 is controlled to shift disconnect clutch 70 into a "disconnected" mode. With transfer clutch 42 in its release mode, no drive torque is transmitted through transfer clutch 42 to front output shaft 44 such that all drive torque is delivered from powertrain 12 to rear wheels 22 via rear driveline 14. With disconnect clutch 70 in its disconnected mode, axleshaft segments 32A, 32B are disconnected such that rotation of front wheels 30 during motive operation of vehicle 10 does not cause front propshaft 56 and front output shaft 44 to be back-driven.

To establish the lock-4WD mode, disconnect actuator 68 is controlled to shift disconnect clutch 70 into a "connected" mode and clutch actuator 66 is controlled to shift transfer clutch 42 into a "fully-engaged" mode. With transfer clutch 42 operating in its fully-engaged mode, rear output shaft 40 is, in effect, drivingly coupled to front output shaft 44 such that the drive torque is equally distributed therebetween. With disconnect clutch 70 in its connected mode, shaft segments 32A, 32B are drivingly connected such that drive torque delivered to front output shaft 44 is transferred via front driveline 16 to front wheels 30.

To establish the AUTO-4WD mode, disconnect clutch 70 is shifted into or maintained in its connected mode and clutch actuator 66 operates to adaptively regulate the drive torque distribution ratio between rear output shaft 40 and front output shaft 44 by varying operation of transfer clutch 42 between its released and fully-engaged modes. The desired distribution ratio is based on and determined by control logic associated with controller unit 72 and which is configured to automatically determine a desired amount of the total drive torque to be transferred to front output shaft 44 based on the operating characteristic and/or road conditions detected by sensors 72.

Figure 2:
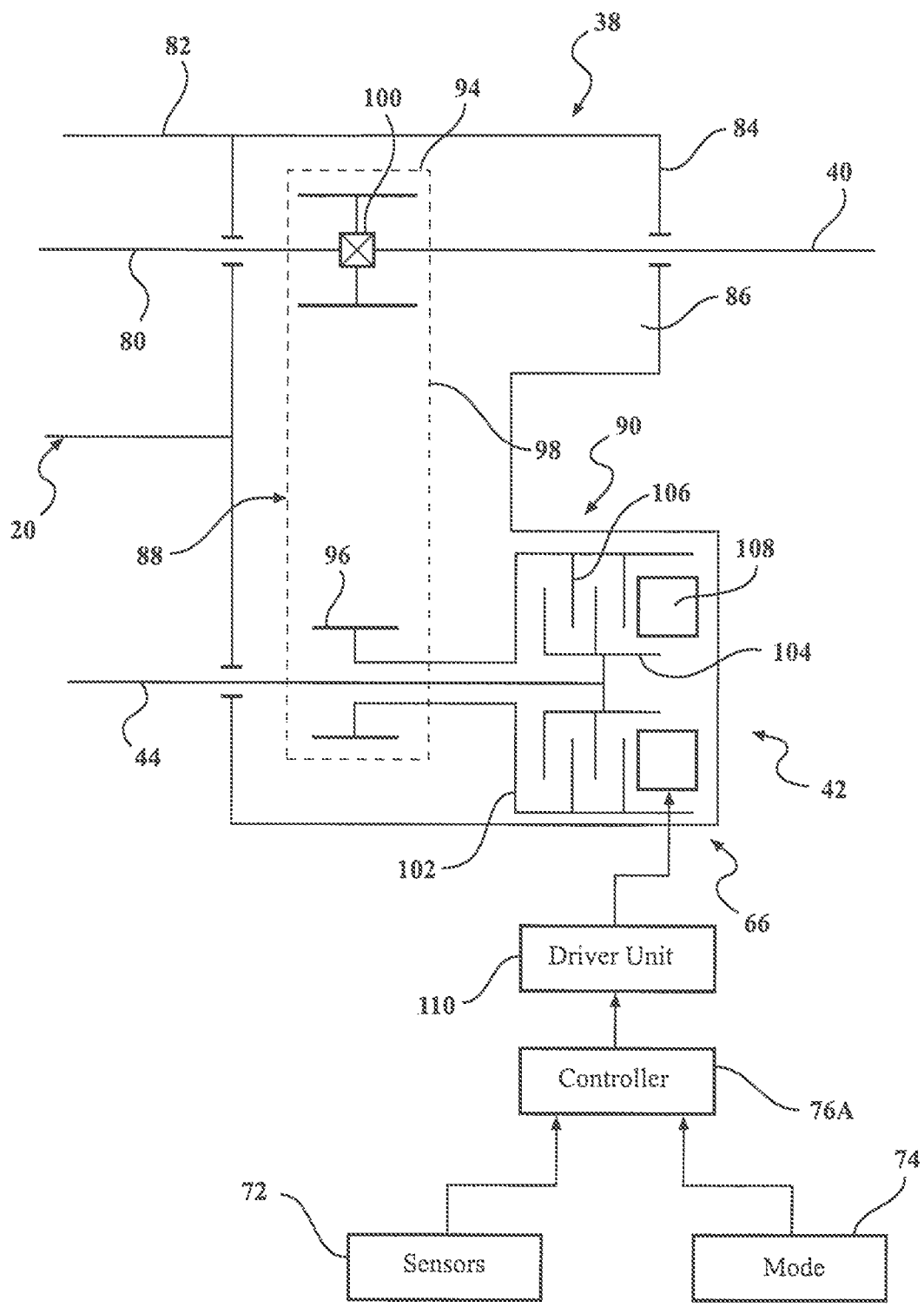
FIG. 2 is a diagrammatical illustration of a power transfer assembly, embodied as a transfer case, associated with the 4WD power transfer system shown in FIG. 1.

Referring now to FIG. 2, a non-limiting example of transfer case 38 will be described. In the arrangement shown, a transmission output shaft 80 extends from a transmission housing 82 into a transfer case housing 84 that is adapted to be secured to transmission housing 82 and which defines an internal chamber 86. Transmission shaft 80 is coupled for common rotation with rear output shaft 40. Transfer case 38 is shown in FIG. 2 to further include a transfer assembly 88 drivingly connected to rear output shaft 40. Transfer clutch 42 is configured to include a multi-plate friction clutch assembly 90 with power-operated clutch actuator 66 configured to selectively engage friction clutch assembly 90 for transmitting drive torque from rear output shaft 40 through transfer assembly 88 to front output shaft 44. Transfer assembly 88 can be configured as a geared drive assembly or as a chain drive assembly. In the particular example disclosed, transfer assembly 88 is a chain and sprocket drive assembly having a first sprocket 94 drivingly coupled to rear output shaft 40, a second sprocket 96 rotatably supported on front output shaft 44, and a continuous power chain 98 encircling and meshing with both first sprocket 94 and second sprocket 96. A coupling interface 100 is schematically shown for indicating a direct coupling of first sprocket 94 with rear output shaft 40.

Clutch assembly 90 is shown to include a first clutch member 102 coupled for rotation with second sprocket 96, a second clutch member 104 coupled for rotation with front output shaft 44, and a multi-plate clutch pack 106 comprised of a plurality of interleaved inner and outer clutch plates. Power-operated clutch actuator 66 includes an axially moveable apply device 108 capable of applying a compressive clutch engagement force on clutch pack 106, and a powered driver unit 110 operable for controlling the axial position of apply device 108 relative to clutch pack 106.

As is well known, the magnitude of the clutch engagement force exerted on clutch pack 106 is proportional to the amount of drive torque transmitted from rear output shaft 40 through transfer assembly 88 to front output shaft 44. Accordingly, when a predetermined minimum clutch engagement force is applied to clutch pack 106, a minimum drive torque is transmitted to front driveline 16. In contrast, when a predetermined maximum clutch engagement force is applied to clutch pack 106, a maximum drive torque is transmitted to front driveline 16. As such, adaptive control of the front/rear drive torque distribution ratio can be provided by actively controlling operation of transfer clutch 42 within transfer case 38 to establish a two-wheel drive (2WD) mode and an on-demand four-wheel drive (4WD) mode. FIG. 2 also illustrates a transfer case controller 76A associated with vehicle controller 76 of FIG. 1 that is operable for controlling actuation of powered driver unit 110 which, in turn, controls the axial position of apply device 108 relative to clutch pack 106.

Figure 3:
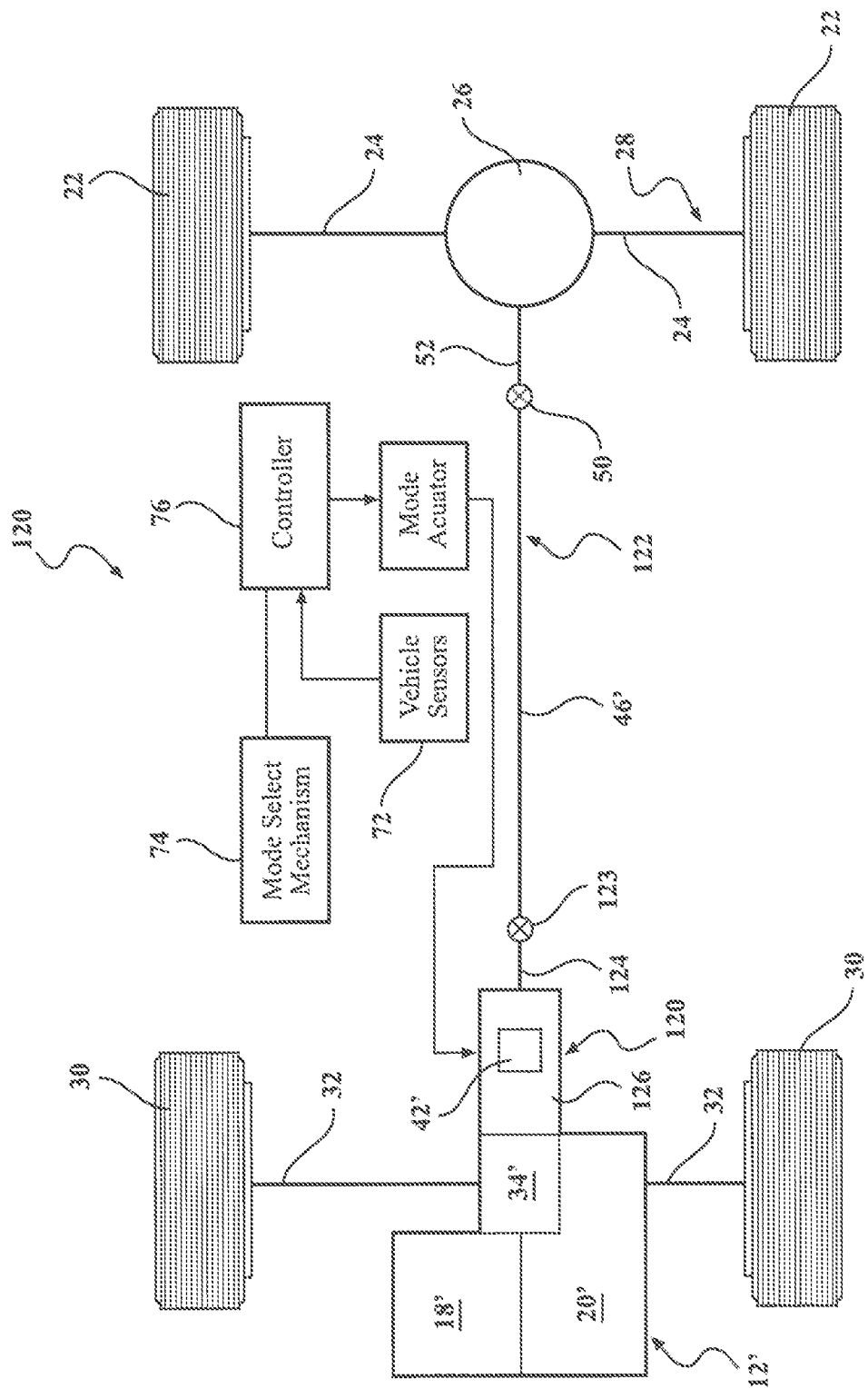
FIG. 3 is schematic view of an all-wheel drive motor (AWD) vehicle equipped with one or more products and/or assemblies embodying the teachings of the present disclosure.

Referring now to FIG. 3, an example of an all-wheel drive (AWD) power transfer system for a motor vehicle 10' is shown. Motor vehicle 10' includes a powertrain 12' comprised of an engine 18' and a transmission 20'. Primary driveline, in this non-limiting example, is front driveline 120. Drive torque from powertrain 12' is transmitted through front differential assembly 34' to front wheels 30 via front axleshafts 32. Secondary driveline, in this embodiment, is rear driveline 122. Rear driveline 122 includes a rear propshaft 46' having one end drivingly coupled via joint coupling 50 to pinion shaft 52. The opposite end of rear propshaft 46' is shown drivingly coupled via another joint coupling 123 to an output component 124 of a power take-off unit 126. As will be detailed, output component 124 is a pinion shaft such that the integrated pinion shaft/constant velocity joint assemblies of the present disclosure are applicable to the interconnection between pinion shaft 124 and joint coupling 123.

Figure 4:
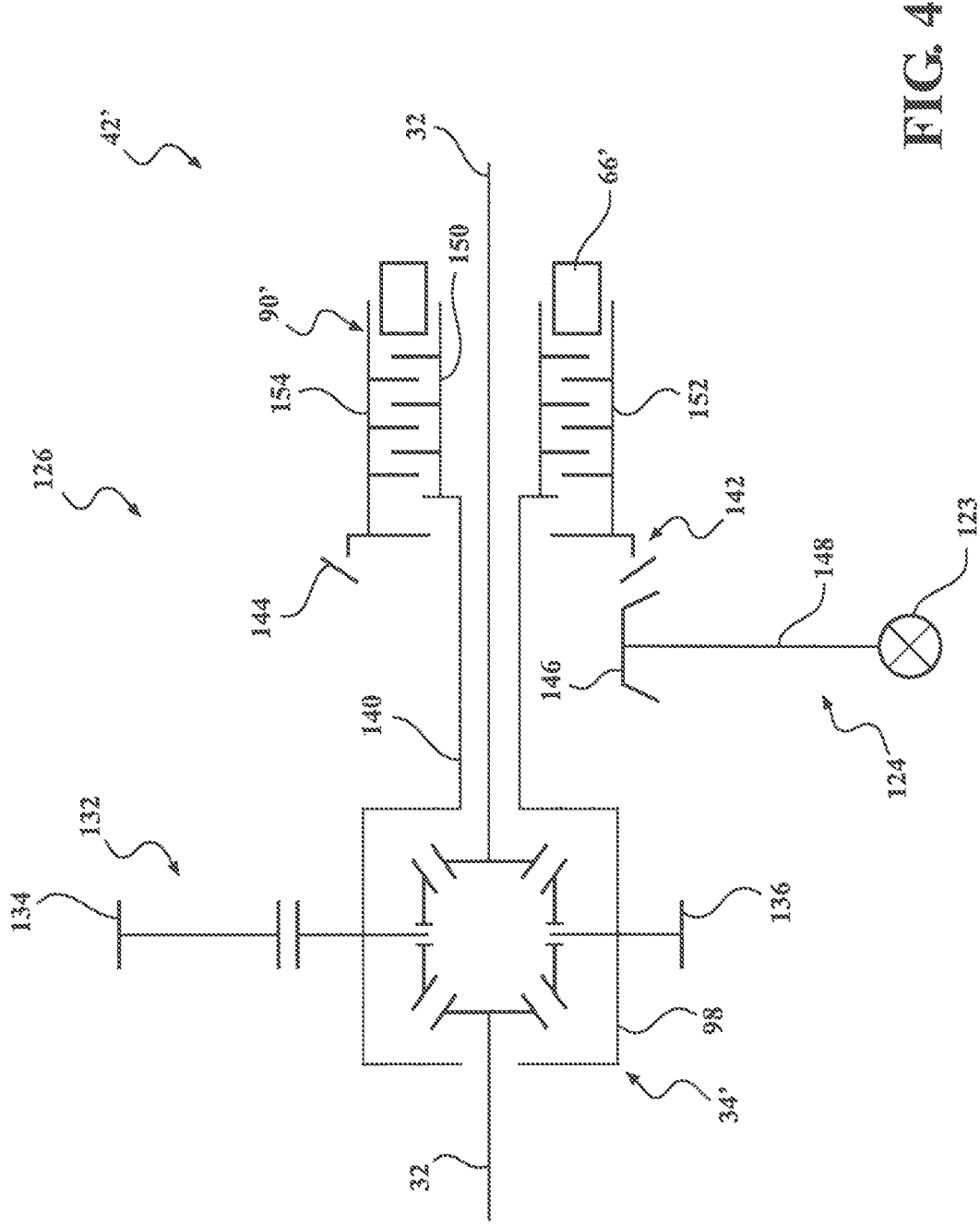
FIG. 4 is a diagrammatical illustration of a power transfer assembly, embodied as a power take-off unit, associated with the AWD power transfer system shown in FIG. 3.

FIG. 4 diagrammatically illustrates a non-limiting example of power take-off unit (PTU) 126. A final drive gearset 132 of transmission 20' includes an output gear 134 driving a ring gear 136 fixed to a front differential carrier 138 of front differential assembly 34'. PTU 136 includes an input shaft 140 driven by gearset 132 or differential carrier 138, a hypoid gearset 142, and a torque transfer coupling 42' therebetween. Hypoid gearset 142 includes a ring gear 144 meshed with a pinion gear 146 which, in turn, is drivingly connected to a pinion shaft 148 which acts as output component 124. Transfer coupling 42' includes, in this non-limiting example, a multi-plate clutch assembly 90' and a power-operated clutch actuator 66'. Clutch assembly 90' includes a first clutch member 150 coupled to input shaft 140, a second clutch member 152 coupled to ring gear 144, and a multi-plate clutch pack 154. When a minimum clutch engagement force is applied to clutch pack 154, a minimum drive torque is transmitted via hypoid gearset 142 to rear driveline 122. In contrast, engagement of clutch pack 154 results in transfer of drive torque to rear driveline 122. This allows establishment of the above-noted 2WD and 4WD modes of operation for vehicle 120.

Figure 5:
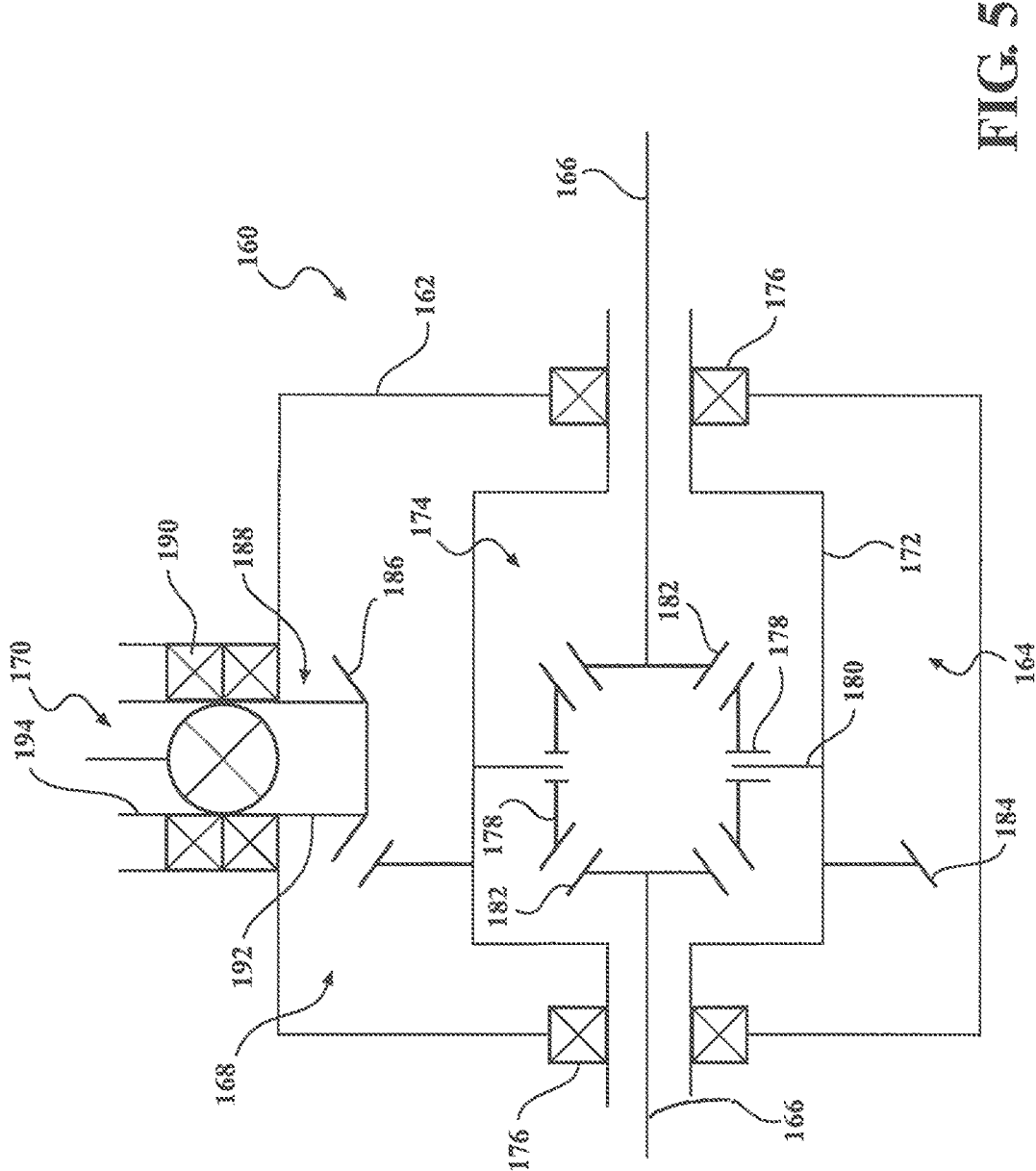
FIG. 5 is a diagrammatical illustration of a drive axle assembly associated with the 4WD motor vehicle of FIG. 1 and the AWD motor vehicle of FIG. 3 which includes a differential gear mechanism, a hypoid gearset and a constant velocity joint that are configured and arranged to embody the teaching of the present disclosure.

Referring now to FIG. 5, a drive axle assembly 160 is diagrammatically shown to generally include an axle housing 162, a differential assembly 164 supported by axle housing 162, a pair of axleshafts 166, a hypoid gearset 168, and a constant velocity joint 170. Differential assembly 164 includes a differential carrier 172 driving a differential gearset 174 which, in turn, is drivingly connected to axleshafts 166. Differential carrier 172 is rotatably supported in a differential portion of the axle housing 162 by a pair of laterally-spaced bearing units 176. Differential gearset 174 includes at least one pair of differential pinions 178, rotatably mounted on pins 180 fixed to differential carrier 172, and which are meshed with a pair of differential output gears 182. Differential output gears 182 are each fixed to one of axleshafts 166. Hypoid gearset 168 includes a ring or crown gear 182 fixedly secured for rotation with differential carrier 172, and a pinion gear 186 driven by a pinion shaft 188. Pinion shaft 188 is rotatably supported in a hypoid portion of axle housing 162 via a cartridge-type bearing unit 190. As will be detailed, pinion shaft 188 is a hollow tubular steel component having a first end segment 192 on which pinion gear 186 is formed and a second end segment 194 with which constant velocity joint 170 is operably associated. In particular, constant velocity joint 170 may be of a fixed type (cage and ball or tripod, etc.) or a plunging type (cage and ball, cross-grooved, tripod, etc.) that is integrated into, or in association with, second end segment 194 of hollow pinion shaft 188. The following detailed description of various embodiments of an integrated pinion shaft and constant velocity joint (PS/CVJ) assembly are intended to be applicable to any of the joint and shaft combinations associated with rear driveline 14 (50, 52) and/or front driveline 16 (60, 62) of FIG. 1 as well as those associated with rear driveline 122 (48, 148 and/or 50, 52) of FIG. 3.

Figure 6:
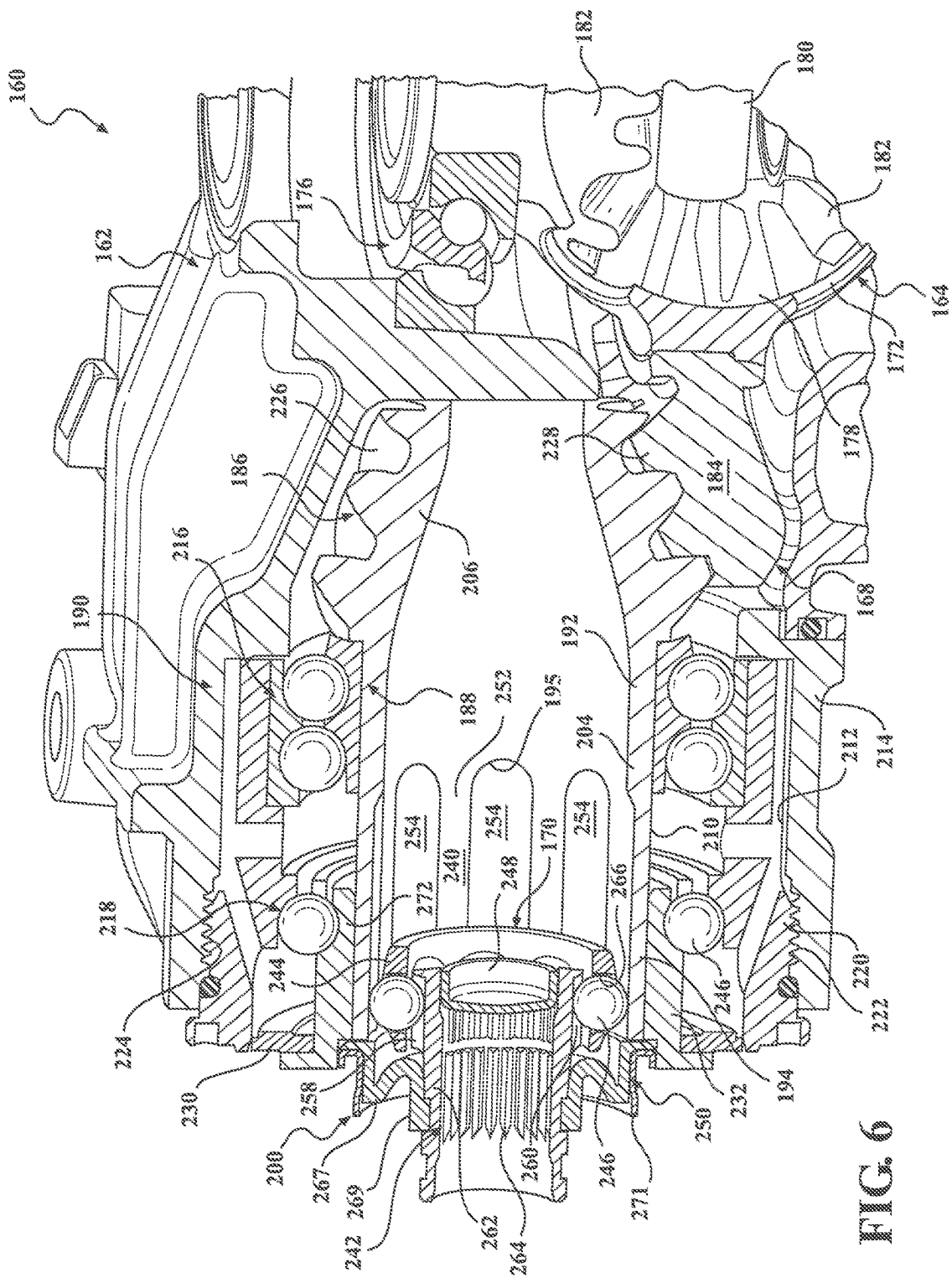
FIG. 6 is a partially-sectioned isometric view of a pinion shaft and constant velocity joint arrangement defining an integrated pinion shaft/constant velocity joint (PS/CVJ) assembly constructed in accordance with a first non-limiting embodiment of the present disclosure.
Figure 7:
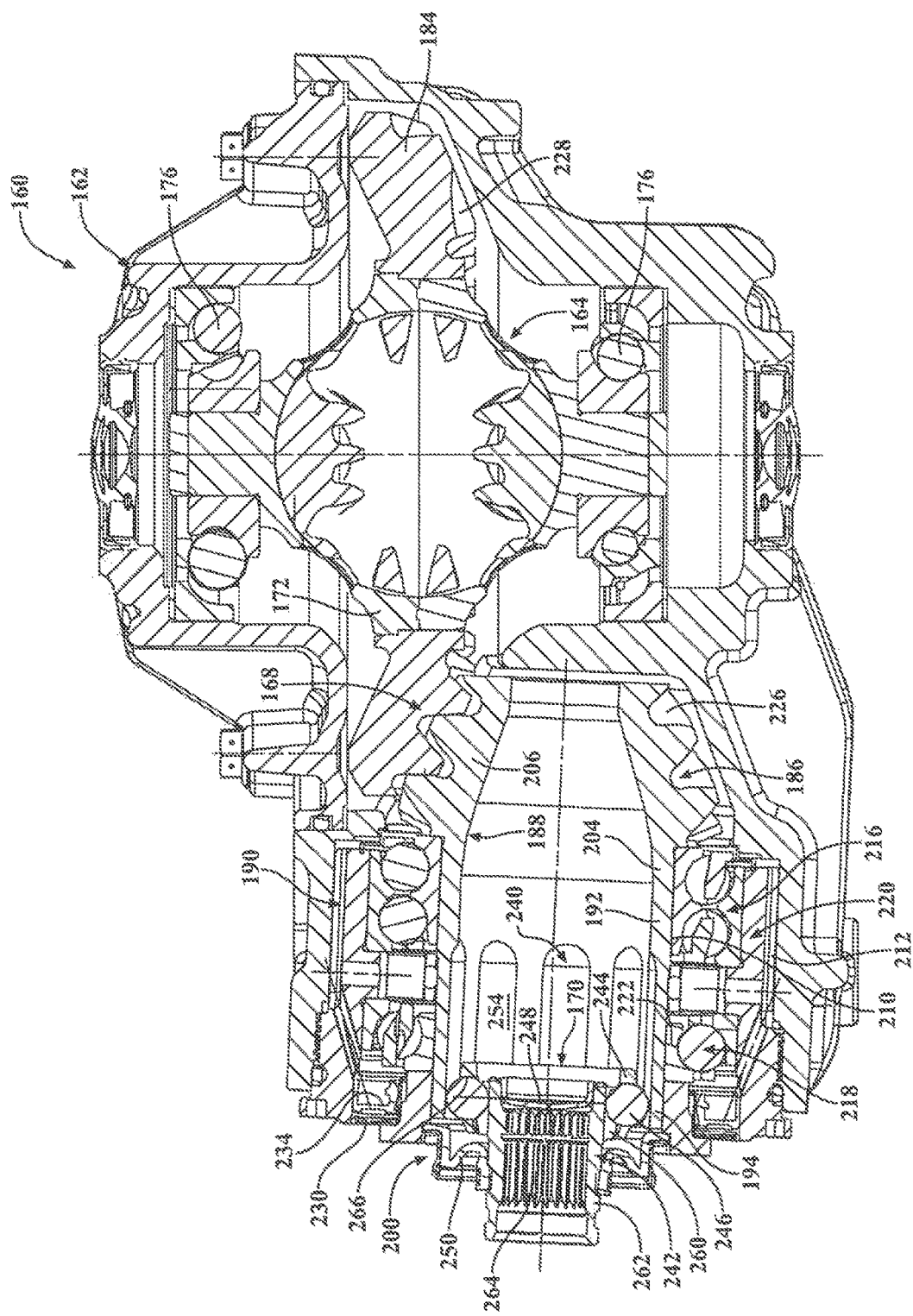
FIG. 7 is a sectional view of the integrated PS/CVJ assembly shown in FIG. 6 installed in the drive axle assembly.

Referring now to FIGS. 6 and 7, a first non-limiting embodiment of PS/CVJ assembly 200 is shown as integrating a plunging-type ball and cage constant velocity joint 170 into hollow end segment 194 of pinion shaft 188. Pinion shaft 188 and pinion gear 186 together define a pinion unit 202 configured as a hollow steel component (preferably forged) having a tubular shaft segment 204 and a tubular pinion gear segment 206. While shaft segment 204 and gear segment 206 are shown integrally formed as a homogeneous steel component, it will be understood that gear segment 206 can alternatively be a separate component, made possibly of a different material, that is rigidly secured to first end 192 of shaft segment 204. Bearing unit 190 is shown disposed between an outer cylindrical surface 210 of shaft segment 204 and an inner cylindrical surface 212 of a pinion support segment 214 of axle housing 162. Bearing unit 190 includes a first bearing assembly 216 and a second bearing assembly 218 that are axially spaced via a separator ring associated with a bearing housing 220. Bearing housing 220 includes external threads 222 configured to engage internal threads 224 formed in an end portion of pinion support segment 214 of axle housing 162. This threaded engagement permits axial adjustment of bearing housing 220 relative to axle housing 162 for setting the backlash between pinion gear teeth 226 and crown gear teeth 228. A sealing arrangement is provided to seal bearing unit 190 relative to pinion shaft 188 within pinion support segment 214 of axle housing 162. The sealing arrangement includes a seal ring 230 fixed to an axial extension 232 of an inner race 272 associated with second bearing assembly 218, and a flexible rotary seal 234 disposed between seal ring 230 and bearing housing 220. Additionally, extension 232 is press-fit onto outer surface 210 of second end segment 194 of pinion shaft segment 204 for setting and maintaining the preload of bearings 216 and 218.

FIGS. 6 and 7 illustrate constant velocity joint 170 to generally include an outer race 240, an inner race 242, a cage 244, a plurality of torque transferring elements or balls 246, an inner race cup plug 248, and a boot assembly 250. Outer race 240 is integrally associated with shaft segment 204 of pinion shaft 188 and, in particular, with an inner cylindrical surface 252 thereof having a plurality of longitudinally-extending outer race grooves 254 formed therein. Grooves 254, hereinafter referred to as outer guide tracks, may alternatively have an arcuate profile as compared to the longitudinally-aligned configuration shown. Outer tracks 254, as formed in surface 252, are preferably machined to extend from open end 194 of shaft segment 204 to a groove end surface 195 delimiting the axial plunging range of travel provided by constant velocity joint 170.

Inner race 242 has a spherical end segment 258 within which a plurality of longitudinally-extending inner race grooves 260, also referred to as inner guide tracks, are formed. A stub shaft segment 262 extends axially from spherical end segment 258 of inner race 242 and has an inner surface formed with inner spline teeth 264 configured to a mate with a shaft segment (not shown) of the drive component (i.e. the propshaft). Stub shaft segment 262 and spherical end segment 258 are shown, in this non-limiting arrangement, to be formed as a unitary inner race component. Cup plug 248 is installed within a non-splined end portion of stub shaft segment 262 to seal the interior of pinion shaft 188 from the interior of shaft segment 262. Cage 244 is shown disposed between inner race 242 and outer race 240. Cage 244 is formed to include a plurality of cage apertures 266. Balls 246 extend through cage apertures 266 and each is disposed within an aligned pair of outer tracks 254 and inner tracks 260. Boot assembly 250 includes a resilient boot 267 which extends between shaft segment 262 of inner race 242 and an end portion of inner race extension 232 on second bearing assembly 218 in proximity to the terminal end surface of second end segment 194 of pinion shaft 188. Boot 267 is secured to stub shaft 262 via a first retainer ring 269 and to inner race extension 232 via a second retainer ring 271.

Plunging ball and cage constant velocity joint 170 transmits driveline torque while providing constant rotational speed at all operating angles established between inner race 242 and outer race 240 and is well-suited for connection of inner race 242 to an end of a driveline propshaft to permit axial movement between the propshaft and hollow pinion shaft 188 while providing a compact PS/CVJ assembly 200 with reduced axial packaging requirements and reduced cost and weight when compared to otherwise conventional arrangements. While constant velocity joint 170 is shown configured as a plunging type, those skilled within the art will recognize that a fixed-type ball and cage version can be alternatively incorporated into hollow shaft segment 204 of pinion shaft 188. Regardless of the type, direct integration of the constant velocity joint into an end segment of a hollow pinion shaft also provides a crash optimization feature by allowing the propshaft to slide into the pinion shaft and relative to the axle housing to permit compression during an impact situation with little axial resistance. Additionally, this direct integration permits the setting and maintenance of the bearing preload.

Figure 8:
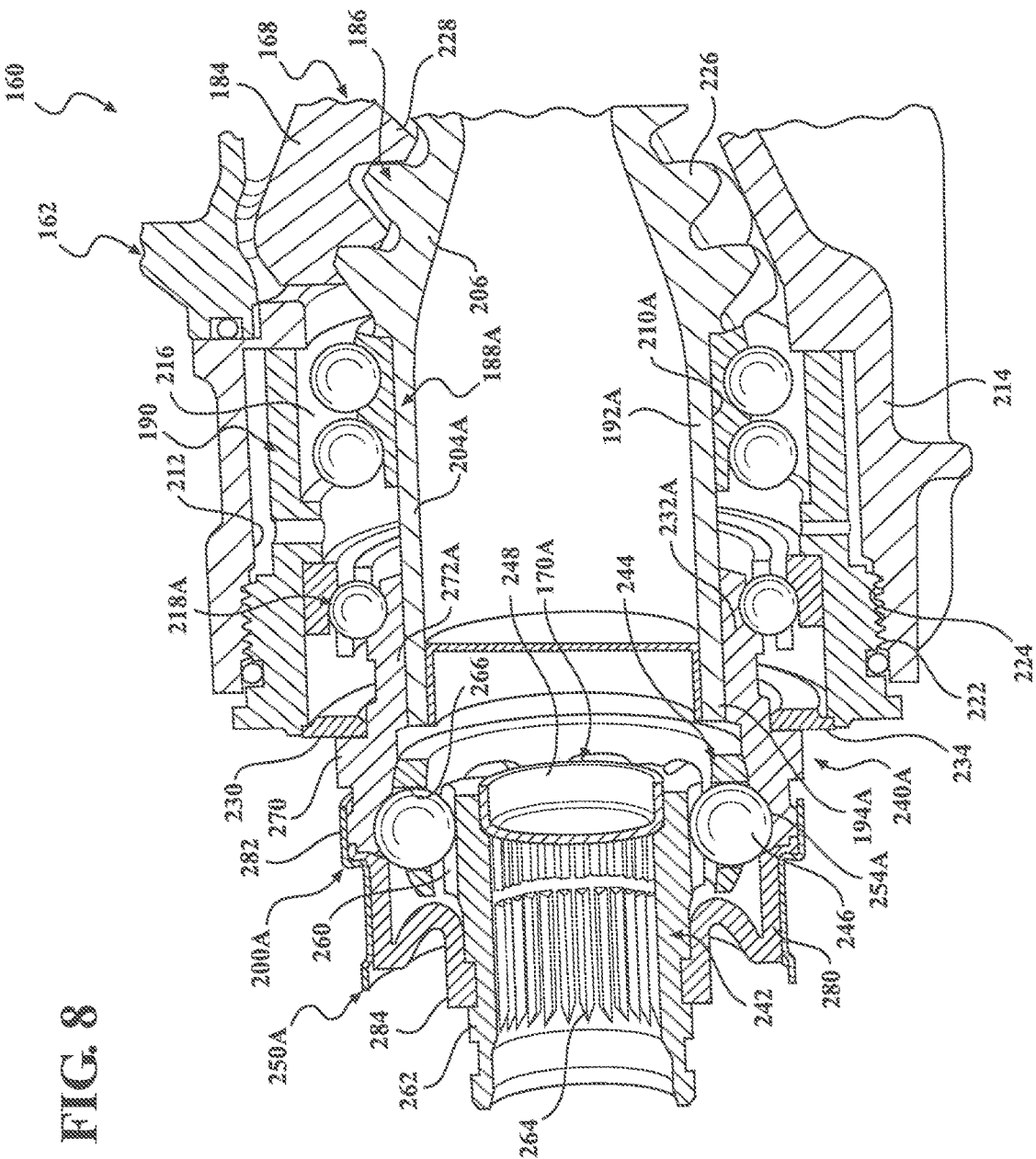
FIG. 8 is a partially-sectioned isometric view of another integrated PS/CVJ assembly constructed in accordance with a second-non-limiting embodiment of the present disclosure.

Referring now to FIGS. 8 and 9, a second non-limiting embodiment of a PS/CVJ assembly 200A is shown as integrating a fixed-type ball and cage constant velocity joint 170A into an extension 232A of an inner bearing race 272 of second bearing assembly 218. PS/CVJ assembly 200A is thus configured to locate constant velocity joint 170A in driven connection with second end segment 194A of shaft segment 204A of pinion shaft 188A instead of being integrated internally therein as configured with PS/CVJ assembly 200. In particular, outer race 240A of constant velocity joint 170A is now formed in association with an enlarged ring section 270 of inner bearing race 272 associated with bearing assembly 218A. Extension segment 232A of inner bearing race 272A is fixed to outer surface 210A of shaft segment 204A. Race extension 232A provides an arrangement for setting and maintaining bearing preload. Outer tracks 254A are formed in enlarged ring section 270 of inner bearing race 272A. Boot assembly 250A includes a resilient boot 280 fixed via an outer collar 282 to ring section 270, as well as to shaft segment 262 of inner race 242 via an inner collar 284. A vent cup 285 is installed within second end segment 194 of pinion shaft 188. Obviously, a plunging type version of constant velocity joint 170A can alternatively be provided by extending the length of ring section 270 and substituting elongated longitudinally-extending outer tracks (similar to tracks 254) in place of outer tracks 254A. PS/CVJ assembly 200A provides the same weight and cost reduction advantages, as well as the crash optimization feature noted in relation to PS/CVJ assembly 200. The integration of outer race 240A on constant velocity joint 170A and bearing race 272 of bearing unit 218 provides an advantage over conventional arrangements.

Figure 10:
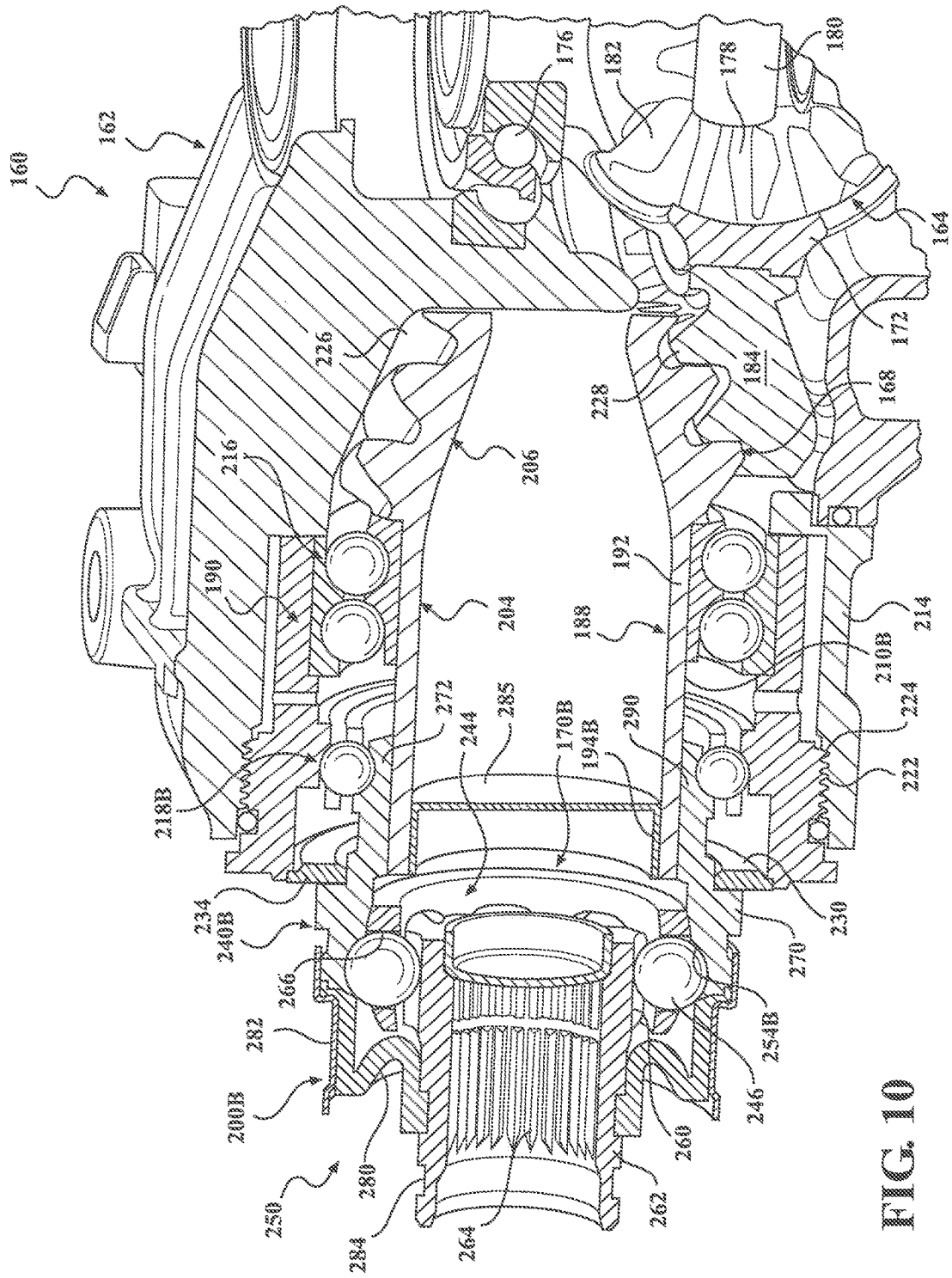
FIG. 10 is a partially-sectional isometric view of yet another integrated PS/CVJ assembly constructed in accordance with a third non-limiting embodiment of the present disclosure.
Figure 11:
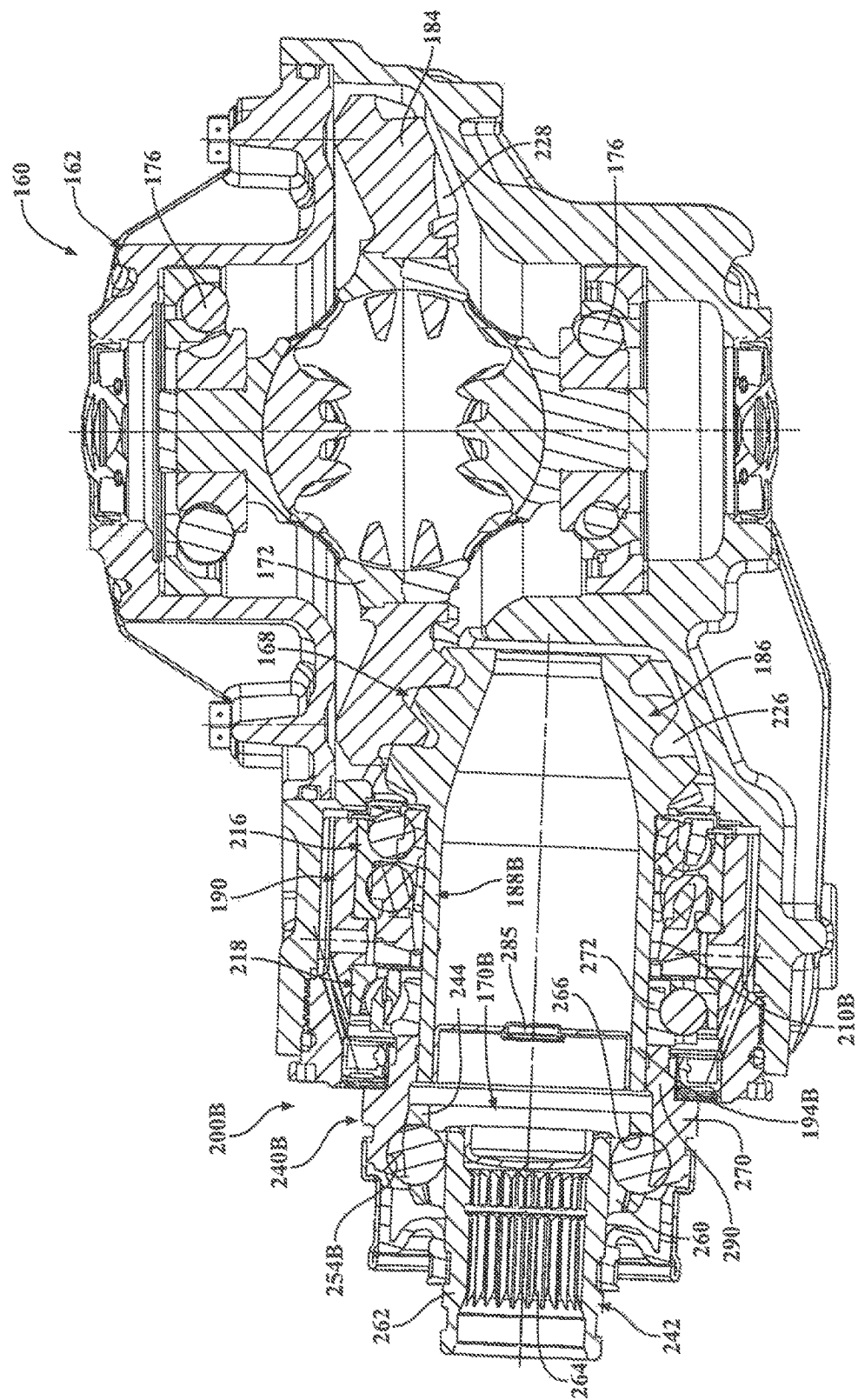
FIG. 11 is a sectional view of the integrated PS/CVJ assembly shown in FIG. 10 installed in the drive axle assembly.

FIGS. 10 and 11 disclose a third non-limiting embodiment of a PS/CVJ assembly 200B which is generally similar in structure and function to that of PS/CVJ assembly 200A of FIGS. 8 and 9, with the exception that outer race 240B is a separate component that is not integrated into extension 232A of second bearing assembly 218. In particular, outer race 240B of constant velocity joint 170B includes ring segment 270 and an axial tubular extension 290 that is fixedly secured to outer surface 210B on second end 194B of pinion shaft 188B. Outer tracks 254B are formed in outer race 240B. Thus, constant velocity joint 170B is practically identical in structure and function to that of constant velocity joint 170A of FIGS. 8 and 9. Tubular extension 290 of outer race 240B of constant velocity joint 170B is again configured to permit the setting and maintenance of the preload of the bearings 218B and 216.

Referring now to FIGS. 12 and 13, PS/CVJ assembly 200A (FIGS. 8 and 9) is now shown in connection with drive axle assembly 160 and a propshaft 290. Specifically, an end segment 292 of propshaft 290 has external splines 294 meshed with internal splines 264 formed in stub shaft segment 262 of inner race 242. A retainer clip 296 is located in aligned grooves 298 and 300 formed respectively in stub shaft segment 262 and propshaft end segment 292. As such, propshaft 290 is assembled and retained in its normal operating position relative to PS/CVJ assembly 200A as shown in FIG. 12. However, in the event of a crash or collision event applying an axially directed force (F) of a predefined magnitude in the direction of Arrow 310, retainer clip 296 will be released from grooves 298, 300 and permit axial movement of propshaft 290 relative to PS/CVJ assembly 200A toward the retracted position shown in FIG. 13. This axial movement of propshaft 290 is limited in the direction of Arrow 310 by engagement between a shoulder portion 312 of propshaft 290 and a terminal end portion 314 of inner race stub shaft segment 262. From FIG. 13 it is seen that such axial displacement of propshaft 290 results in release of cup plug 248 from inner race 242. Obviously, this arrangement is available with any of the PS/CVJ assemblies discussed and detailed herein.

While each of the alternative embodiments discloses a cage and ball type of constant velocity joint, the scope of the present disclosure is intended to encompass other suitable types of fixed and plunging configurations such as, for example, cross-groove and tripod types of constant velocity joints arranged to be integrated directly into a hollow pinion shaft or integrated into a collinear assembly therewith.

Each of the integrated PS/CVJ assemblies is preferably pre-assembled in combination with bearing unit 190 to provide a pinion-bearing-coupling (PBC) assembly with "pinion" referring to pinion unit 202, "bearing" referring to dual bearing unit 190, and "coupling" referring to constant velocity joint 170. Bearing unit 190 can be configured as a cartridge arranged within pinion support section 214 of axle housing 162.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power transfer assembly for transmitting drive torque from a powertrain to a pair of wheels in a motor vehicle, comprising:
   a rotary input driven by the powertrain;
   a rotary output drivingly connected to the pair of wheels; and a hypoid gearset operable to transfer drive torque from said rotary input to said rotary output, said hypoid gearset including a ring gear drivingly connected to said rotary output and an integrated pinion-bearing-coupling (PBC) assembly drivingly connected to said rotary input, wherein said PBC assembly includes a pinion unit, a bearing unit, and a coupling unit, said pinion unit being configured to include a hollow pinion shaft segment and a pinion gear segment in meshed engagement with said ring gear, said pinion shaft segment and said pinion gear segment being integrally connected with one another, said bearing unit being configured to rotatably support said hollow pinion shaft for rotation within a housing, said coupling unit being configured as a constant velocity joint having an outer race formed within said hollow pinion shaft segment, an inner race drivingly connected to said rotary input, and torque transmitting elements disposed between said inner race and said outer race.

2. The power transfer assembly of claim 1, wherein said rotary input is a propshaft receiving drive torque from the powertrain, wherein said rotary output is a differential assembly drivingly connected to the pair of wheels, and wherein said ring gear is fixed for rotation with a differential carrier of said differential assembly.

3. The power transfer assembly of claim 2, wherein said constant velocity joint is a ball and cage unit having a plurality of outer tracks formed in an inner diameter surface of said hollow pinion shaft segment to define said outer race, a plurality of inner tracks formed in said inner race, a cage configured to include a plurality of cage apertures, and a plurality of balls acting as said torque transmitting elements, and wherein each of said balls extends through one of said cage apertures and is retained within an aligned pair of said inner and outer tracks.

4. The power transfer assembly of claim 3, wherein said inner race includes a hollow coupler shaft segment configured to receive an end segment of said propshaft therein.

5. The power transfer assembly of claim 4, wherein said plurality of outer tracks are elongated to permit axial translation of said coupler shaft segment relative to said hollow pinion shaft segment for providing a plunging type of said ball and cage unit.

6. The power transfer assembly of claim 3, wherein said pinion shaft segment and said pinion gear segment of said pinion unit are configured as a homogeneous steel component.

7. The power transfer assembly of claim 2, wherein said differential carrier is rotatably supported by a pair of laterally-spaced differential bearings in an axle housing, wherein said differential assembly includes a differential gearset configured to transfer drive torque from said differential carrier to a pair of axleshaft that are interconnected to the pair of wheels, wherein said bearing unit includes a pair of pinion bearings disposed between an outer surface of said pinion shaft segment and an inner surface on a pinion support segment of said axle housing, and wherein said inner race of said constant velocity joint is disposed within an open end of said pinion shaft segment.

8. A drive axle assembly for transmitting drive torque from a powertrain to a pair of wheels in a motor vehicle, comprising:
an axle housing defining a differential chamber and a pinion chamber;
a differential assembly having a differential carrier rotatably supported in said differential chamber of said axle housing, and a differential gearset drivingly connecting said differential carrier to a pair of axleshafts connected to the pair of wheels;
a hypoid gearset including a ring gear fixed for rotation with said differential carrier and a pinion gear meshed with said ring gear, said pinion gear extending from a first end of a hollow pinion shaft that is rotatably supported in said pinion chamber of said axle housing; and
a constant velocity joint operably coupled to a second end of said hollow pinion shaft, said constant velocity joint having a first joint component drivingly connected to said second end of said pinion shaft, a second joint component receiving drive torque from the powertrain, and torque transmitting elements configured to transmit drive torque from said second joint component to said first joint component;
wherein said constant velocity joint is a cage and ball arrangement having an outer race acting as said first joint component, an inner race acting as said second joint component, a cage disposed between said inner and outer races and having cage apertures, and balls acting as said torque transmitting elements, wherein each of said balls extend through one of said cage apertures and is arranged to engage an aligned pair of an outer guide track formed in said outer race and an inner guide track formed in said inner race;
wherein said outer guide tracks in said outer race are elongated to permit plunging axial movement of said inner race relative to said outer race.

9. The drive axle assembly of claim 8 wherein said elongated outer guide tracks are formed in an inner surface of said second end of said pinion shaft such that said inner race, cage and balls are disposed within said hollow pinion shaft.

10. The drive axle assembly of claim 8 wherein said outer guide tracks are formed in an inner surface of said pinion shaft such that said constant velocity joint is operably disposed within said pinion shaft.

11. The drive axle assembly of claim 8 wherein said outer race includes a first segment fixedly secured to an outer surface of said second end of said pinion shaft, and a second segment within which said outer guide tracks are formed.

12. The drive axle assembly of claim 11, wherein said inner race includes a stub shaft segment configured to receive and be drivingly connected to an end portion of a propshaft driven by the powertrain.

13. The drive axle assembly of claim 12, wherein said stub shaft segment of said inner race is configured to permit axial plunging movement of said end portion of the propshaft into said second end of said pinion shaft.

14. The drive axle assembly of claim 11, wherein said first segment of said outer race is formed as an extension of an inner bearing race associated with a pinion bearing arranged to rotatably support said pinion shaft within said pinion support section of said axle housing.

15. The drive axle assembly of claim 8 wherein said cage of said cage and ball arrangement is collinearly aligned with an end surface on said second end of said pinion shaft.

16. A pinion shaft and constant velocity joint (PS/CVJ) assembly for use with a ring gear and a propshaft in a motor vehicle driveline, comprising:
a pinion shaft having a pinion gear segment meshed with the ring gear and an elongated tubular pinion shaft segment; and
a constant velocity joint having an outer race driven by said pinion shaft segment of said pinion shaft, an inner race driven by the propshaft, a joint assembly disposed between said outer race and inner race to provide constant speed torque transfer therebetween and permit angular movement of said inner race relative to said outer race, and a coupling arrangement between the propshaft and the inner race configured to permit axial movement of the propshaft relative to the constant velocity joint in the event of a collision, said coupling arrangement including at least one retainer clip formed in at least one of said inner race and the prop shaft, and at least one groove formed in the other of said at least one of said inner race and the prop shaft, and wherein said retainer clip is received in said groove.

17. The PS/CVJ assembly of claim 16, wherein said outer race is integral with said pinion shaft segment, and wherein said inner race and joint assembly are disposed inside said pinion shaft segment.

18. The PS/CVJ assembly of claim 16, wherein said outer race is fixedly secured to an outer surface on said pinion shaft segment of said pinion shaft, wherein said inner race includes a tubular stub shaft segment configured to receive and be drivingly coupled to an end segment of the propshaft, and wherein said joint assembly includes a cage located between said outer and inner races and balls retained by cage and each engaging a pair of aligned guide tracks formed in said inner and outer races.

* * * * *